United States Patent [19]

Bennett et al.

[11] Patent Number: 5,178,232
[45] Date of Patent: Jan. 12, 1993

[54] CUTTING MACHINE HAVING LUBRICANT RESERVOIR WITHIN THE HOUSING

[75] Inventors: Lester C. Bennett, Tonawanda; Robert J. Pieroni, Youngstown, both of N.Y.

[73] Assignee: Eastman Machine Company, Buffalo, N.Y.

[21] Appl. No.: 708,920

[22] Filed: May 31, 1991

[51] Int. Cl.⁵ .............................................. F16N 7/12
[52] U.S. Cl. ...................................... 184/6.14; 184/96; 184/102; 30/123.3
[58] Field of Search .................. 184/6.14, 6.15, 102, 184/96, 97, 65; 30/123, 123.3

[56] References Cited

U.S. PATENT DOCUMENTS

| | | | |
|---|---|---|---|
| 1,930,382 | 10/1933 | Bowman | 184/6.15 |
| 2,331,917 | 10/1943 | Kocher | 184/96 |
| 2,771,965 | 11/1956 | Parry et al. | 184/6.15 |
| 2,869,231 | 1/1959 | Gury | 184/102 |
| 3,254,740 | 6/1966 | Bono | 184/6.15 |
| 3,960,244 | 6/1976 | Clark | 184/6.14 |
| 4,096,924 | 6/1978 | Lyden | 184/96 |
| 4,350,105 | 9/1982 | Albrecht et al. | 184/6.15 |

Primary Examiner—Ira S. Lazarus
Assistant Examiner—Alan B. Cariaso
Attorney, Agent, or Firm—Hodgson, Russ, Andrews, Woods & Goodyear

[57] ABSTRACT

A lubrication system for a cutting machine such as a cloth cutting machine. The lubricant reservoir is provided within a housing portion so as to protect it from damage when the machine is laid on its side. An easily removable wicking module is provided with an end adjacent a reservoir outlet so that only a short feeder wick need be provided for transmission of lubricant into the module.

20 Claims, 2 Drawing Sheets

CUTTING MACHINE HAVING LUBRICANT RESERVOIR WITHIN THE HOUSING

The present invention relates generally to cutting machines such as for cutting cloth, as exemplified by U.S. Pat. No. 3,960,244 to Clark, U.S. Pat. No. 3,775,913 to Clark, and U.S. Pat. No. 3,714,742 to Clark, which patents are assigned to the assignee of the present invention and which are incorporated herein by reference. More particularly, the present invention relates to cutting machines having wick lubricators.

In a cloth cutting machine having a reciprocatory knife, it is necessary to convert the rotary motion of an electric motor to the reciprocating motion of the knife. To accomplish this, a crosshead is provided which is driven in a reciprocatory manner through a crank, and the crosshead is guided in its reciprocatory movement by a pair of guides. As discussed in the '244 patent, lubrication of the crosshead-crosshead guide area and the wrist pin on the crosshead has been effected through a lubricant reservoir positioned above the crosshead and through wick means in the lubricant reservoir for conducting lubricant to various points. Thus, as shown in FIG. 1 of the '244 patent, the oil reservoir protrudes outside of the machine housing, i.e., the oil cup is located outside the housing and delivers oil to a pair of wicks in a block of metal which overlies the parts to be lubricated, and the wicks transmit the oil from the oil cup thereto. One arrangement of the wicks is shown in FIG. 3 of the '244 patent. Various other arrangements of the wicks in the wicking block of such a machine have been tried to eliminate void spaces within the block which might cause lubricant pooling.

The use of a cloth cutting machine is illustrated in the '913 patent. The machine includes a base having rollers which roll on a table top supporting the lay of material to be cut. As the machine is thus moved over the table top and guided for cutting of the cloth by an operator who grasps the machine by a handle for such movement, a knife is reciprocated for cutting of the cloth.

Since the cloth cutting machine is portable, it may from time to time be laid on its side with the result that damage to the externally positioned oil cup may occur. Furthermore, the volume of oil which may be carried by the outside oil cup is limited to the extent that it is desired to minimize the oil cup size for purposes such as to minimize the risk of damage during handling of the machine. A small oil cup volume requires frequent addition of oil. Thus, a greater reservoir volume will allow a greater efficiency of machine use.

The external oil cup has also included a cylindrical vertical sight glass which has been difficult to seal against oil leakage therefrom. Thus, while it is desirable to provide a means for sighting the level of oil in a reservoir, it is also desirable to provide such a means which is adequately sealed so that it is not susceptable to leakage.

It is also desirable that the wicking block be connected to the oil reservoir so that it is quickly and easily replaceable.

Moreover, it is considered desirable that the wicking arrangement for such a wicking block be such as to provide the desired quantity of oil to the parts to be lubricated. If too much oil is provided, heat build-up may result due to the increased viscous friction with the reciprocating knife. Thus, it is also considered desirable to prevent the pooling of oil in voids in the wicking block which may result in too much oil being provided to the parts being lubricated as well as undesirable leakage onto the cloth being cut below.

It is accordingly an object of the present invention to position the oil reservoir of a cloth cutting machine so that it is not susceptible to damage when the machine is laid on its side.

It is also an object of the present invention to provide increased volume to the oil reservoir.

It is a further object of the present invention to provide a sight glass for the oil reservoir which is not susceptible to leakage.

It is also an object of the present invention to provide a wicking block which is easily and quickly replaceable while providing effective communication with the oil reservoir.

It is yet another object of the present invention to provide a wicking arrangement for such a wicking block which provides good regulation of lubrication without susceptibility to leakage.

In accordance with the present invention a lubricant reservoir is provided within a housing member thereby allowing a greater reservoir volume and whereby the reservoir is not susceptible to damage if the cloth cutting machine is laid on its side. A circular sight glass is provided in a wall of the reservoir which sight glass is sealed by means of an O-ring and a lock ring so that it is not susceptible to leakage. The wicking block may be easily and quickly attached to the housing by means of a single screw at one end and by means of a oil tube at the other end which is inserted in an aperture in the wicking block and a bore in the housing in communication with the reservoir and which contains a feeder wick providing lubricant communication with a wicking assembly in the wicking block. The wicking assembly is positioned in the wicking block to fill the entrance thereto so that pooling of oil does not occur at the wicking block entrance. Thus, a lubrication system for a cloth cutting machine is provided in accordance with the present invention for less susceptibility to damage or leakage and for a more efficient distribution of lubrication.

The foregoing and other objects, features, and advantages of the present invention will become more apparent from the following detailed description thereof taken in conjunction with the accompanying drawings in which the preferred embodiment of this invention is illustrated.

DETAILED DESCRIPTION OF THE PERFERRED EMBODIMENT

Figure 1:
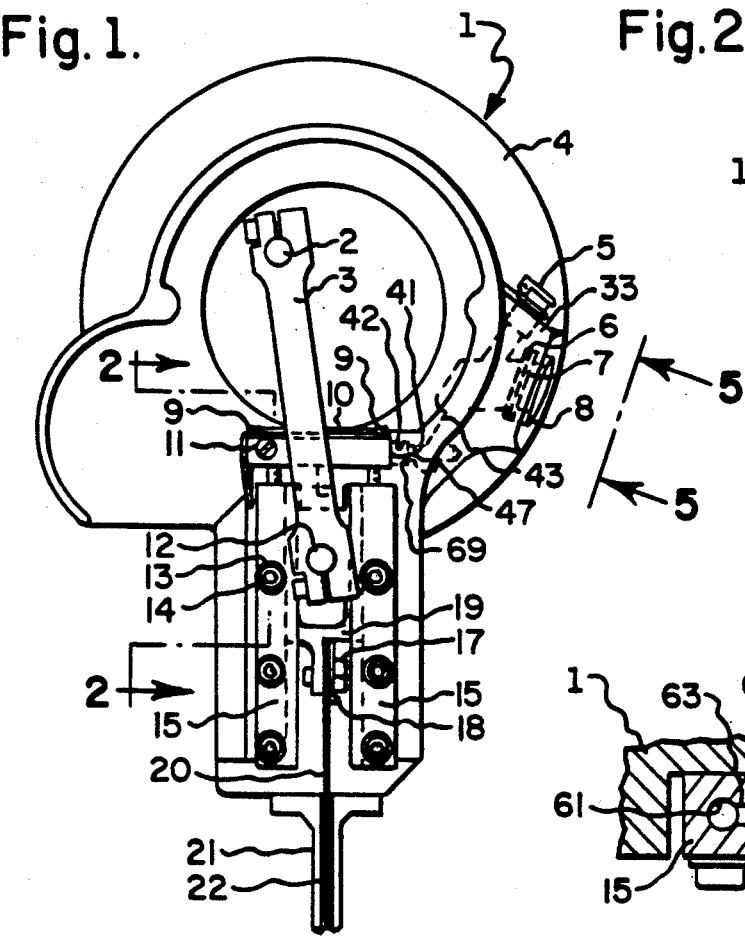
FIG. 1 is a fragmentary side elevational view, with parts removed, of certain portions of the drive mechanism of a cloth cutting machine having a lubrication system which embodies the present invention.
Figure 2:
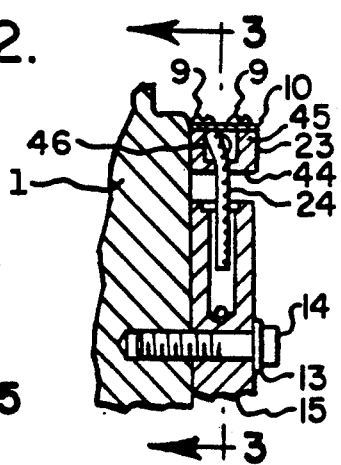
FIG. 2 is a fragmentary cross sectional view taken along lines 2—2 of FIG. 1 and showing certain details of the lubrication system.

Referring to the drawings, there is shown generally at 1 a cloth cutting machine which is generally of the type shown in the aforesaid patents to Clark. The machine 1 includes a front bearing housing 4 mounting a suitable electric motor (not shown) which drives crank pin 2 on which the upper end of link or connecting rod 3 is suitably journalled. The lower end of the link 3 is journalled on one portion of wrist pin 12. Crosshead 19 is also journalled on another portion of wrist pin 12 for reciprocatory movement in the pair of crosshead guides 15 which are secured to the housing portion 4 by means of guide washers 13 and hold-down screws 14. A suitable lock bolt 17 and lock washer 18 secure knife blade 20 to a lower portion or tab forming the lower most portion of crosshead 19. Through this linkage, knife 20 is caused to reciprocate in a guide defined by a knife slide 22 within a knife standard 21 which is attached to and extends downwardly from the housing portion 4.

In order to insure proper lubrication of the crosshead 19 and wrist pin 12 as knife 20 is caused to reciprocate, the lubrication system of the present invention has been developed. In this connection, an oiler tube or wicking block 23 is mounted to the housing portion 4 to be positioned directly above the guides 15 and from which wicks extend downwardly, as will be described in greater detail hereinafter, for conveying lubricant to the various parts of the crosshead 19 and the crosshead guides 15.

Figure 6:
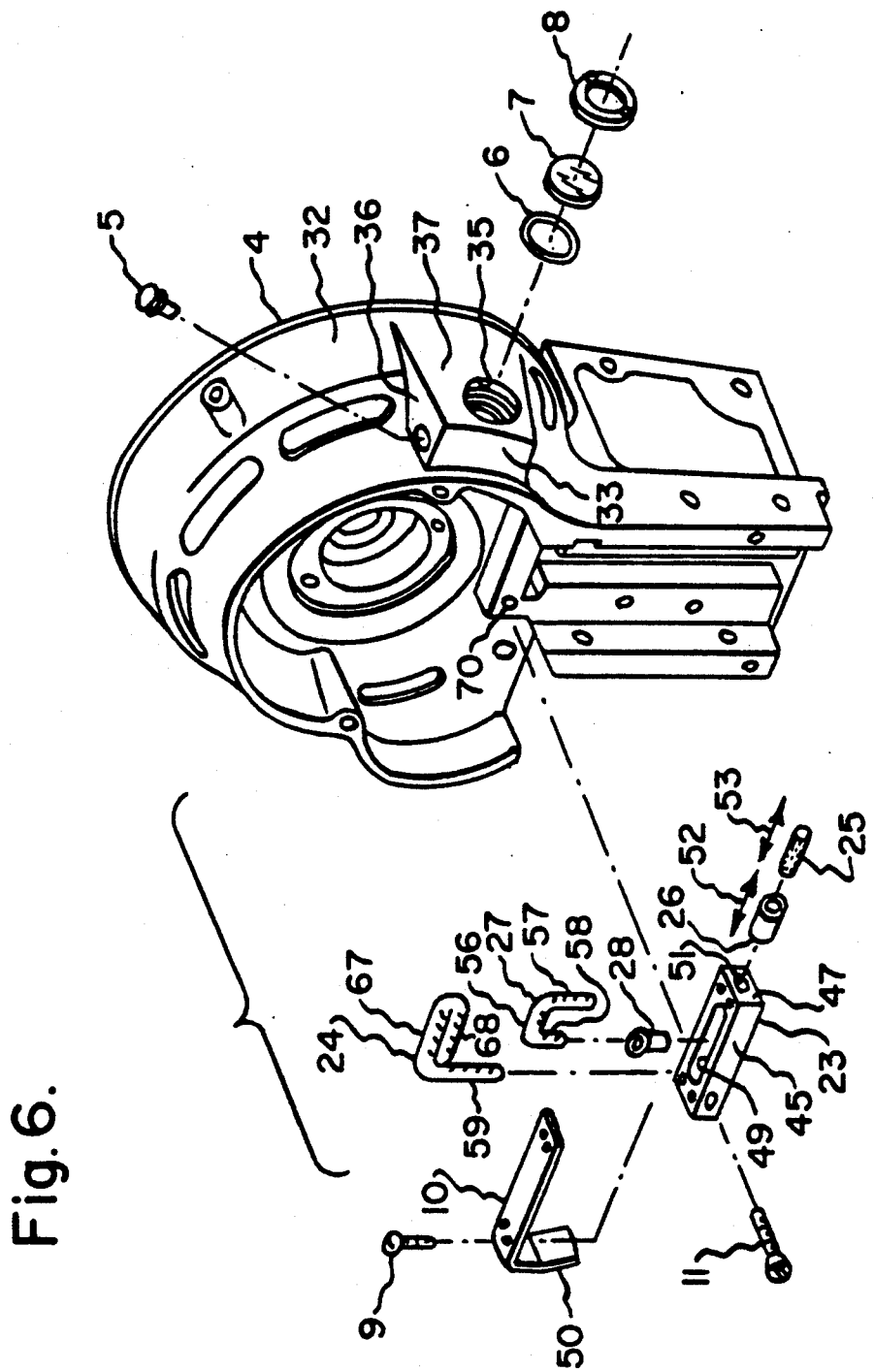
FIG. 6 is an exploded perspective view of a portion of the cloth cutting machine of FIG. 1 showing the relationship of the various parts of the lubrication system.

As best seen in FIG. 6, the housing portion 4 has an outer surface 32 which may be described as generally tapered from front to back. Advantage is taken of this taper to provide an unobtrusive protruding portion 33 of the housing member 4 which is integral therewith and which lies generally within the silhouette of the machine 1. Generally intermediate the height of and within the protruding portion 33 is provided a lubricant reservoir chamber 34 which communicates with bore 35 in the outer surface of the protruding portion for purposes which will be described hereinafter. The protruding portion 33 has a generally horizontal upper surface 36 and a generally vertical outer surface 37. Upper surface 36 lies between the housing surface 32 and the outer surface 37. A bore 38 extends from the reservoir 34 generally upwardly to and provides an opening through the upper surface 36 which opening is closed by a suitable spring cap 5 which serves as an oil hole cover and through which the reservoir 34 is replenished with oil, illustrated at 16. The oil level is illustrated at 71. Thus, the reservoir 34 is built internally of the housing 4 so as to be protected from damage as the machine 1 is laid on its side. The spring cap 5 is, as best seen in FIG. 6, set inwardly from the floor engaging surface 37 so that it is protected from damage by being positioned so as not to contact the floor when the machine 1 is laid on its side.

The oil level 71 may be observed through bore 35, which opens into or interfaces with reservoir 34 and in which is contained a sight glass 7, which may be composed of glass or other suitable clear or see-through material. The sight glass 7 is generally circular and is mounted in the bore 35 by means of a suitable threaded lock ring 8. The bore 35 is sized to be slightly larger than the size of the interface with the reservoir 34 so as to define a shoulder 39 for the circular edge of the sight glass 7. The sight glass 7 is sealed against leakage of oil 16 through the bore 35 by a suitable o-ring 6, which may be composed, for example, of rubber, and which is seated between the circular edge of the sight glass 7 and the shoulder 39.

Housing member 4 has a generally vertical inner surface 40 which faces an end of the wicking block 23 and generally in engagement therewith. A bore 41 in surface 40 extends generally horizontally into the housing member 4 and has an enlarged diameter for a short distance from the surface 40 to define a counterbore 42 terminating at a shoulder 69 intermediate the length of the bore 41. Bore 41 is below the chamber 34, and a bore 43 extends between bore 41 and lubricant chamber 34 and opens thereto so as to provide flow communication between the lubricant chamber 34 and the bore 41.

Increasing the size of the oil cup of the machine of the '244 patent may undesirably increase the susceptibility to damage thereof if the machine were laid on its side. In order to provide increased reservoir volume of perhaps two to four times as much volume for greater efficiency of machine use without increasing such susceptibility to damage thereof, in accordance with the present invention the reservoir is thus provided internally of the housing portion 4. For example, the capacity of the reservoir 34 may perhaps be 3.5 oz. as compared to the capacity of a typical oil cup as shown in the '244 patent of about 1.5 oz.

The oiler tube 23 is an elongate wicking block or module having an elongate floor 44, front and back elongate side walls 45 and 46 respectively, a first end wall 47 which engages the inner surface 40 of the housing member 4, and a second end wall 48. Defined between these walls is a chamber 49 which contains portions of oil felt wicking members 24 and 27. The wicking block 23 is also provided with a removable upper wall or cover plate 10 which is attached thereto by four round head screws 9. The cover plate 10 includes a portion 50 which extends downwardly along and below the second end wall 48 to serve as an oil splatter guard. A suitable sealant such as, for example, RTV sealer, is provided between the cover plate 10 and the upper edges of the walls 45 to 48 to which it engages to guard against the leakage of oil therefrom.

The first end wall 47 has an aperture 51 extending therethrough. Communication between the wicking chamber 49 and lubricant 16 in the bore 41 is provided by a short oil tube or grommet 26 which contains a short oil felt wicking 25. One end portion of the oil tube 26 is contained within the aperture 51, and the other end portion is contained within the counterbore 42. The outer diameter of the oil tube 26 is approximately equal to the diameter of the aperture 51 and the diameter of the counterbore 42. An end of the oil tube 26 seats against the shoulder 69. The oil tube 26 is composed of a clear soft polyurethane or other suitable material which allows it to seal itself in the counterbore 42 to prevent leakage as lubricant is transmitted therethrough via wick 25 into the wicking block chamber 49. Feeder wick 25, which is slightly longer than the length of the oil tube 26, extends outwardly from each end thereof to transmit lubricant 16 from the reservoir 34 into the wicking block chamber 49. The inner diameter of the oil tube 26 is such as to snugly receive the feeder wick 25.

As seen in the '244 patent, the exterior oil cup thereof requires lubricant transmission through wicking over a substantial distance before arriving over the parts to be lubricated. Such a distance may result in greater difficulty in maintaining precise control of lubrication to the parts. For example, it affords a greater possibility that undesirable pooling of the lubricant may occur. With the provision of a reservoir internally of a housing portion and the position of the wicking block 23 with its end wall 47 adjacent an outlet from the reservoir in accordance with the present invention, the oil tube 26 and feeder wick 25 may advantageously be made relatively short for transmission of lubricant 16 effectively and efficiently into the wicking chamber 49 above the parts to be lubricated in order to more precisely control the delivery of lubricant thereto with a reduced possibility of pooling. For example, the oil tube 26 may have a length, illustrated at 52, of perhaps about 0.31 inch, an outer diameter of perhaps about 0.25 inch, and an inner diameter of perhaps about 0.187 inch. The short feeder wick 25 may have a length, illustrated at 53, of perhaps about 0.44 inch and have a diameter of perhaps about 0.187±0.016 inch. In accordance with a preferred embodiment of the present invention the oil tube length 52 need not be more than about 0.33 inch.

Figure 3:
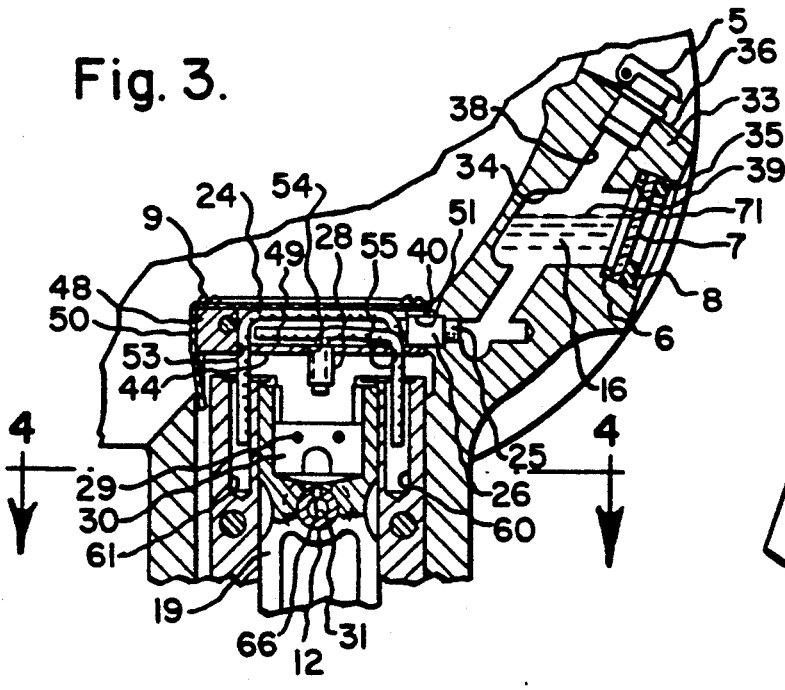
FIG. 3 is a view similar to that of FIG. 2 taken along lines 3—3 of FIG. 2 and showing further details of the lubrication system.
Figure 5:
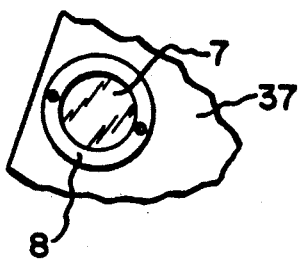
FIG. 5 is an elevational view taken along lines 5—5 of FIG. 1 and showing details of the sight glass assembly for the lubrication system.

With the oil tube 26 fitted between the wicking block 23 and the housing 4, the wicking block 23 may be adequately secured to the housing 4 by means of a single screw 11, of a flat head type, or other suitable fastener, which passes through the end wall 48 from the front wall 45 to the back wall 46 to threadedly engage an aperture 70 in the housing 4. As shown in FIG. 3, the end wall 48 may be provided with an increased thickness to accommodate an aperture therethrough for the screw 11 for more secure attachment of the wicking block 23. Thus, the wicking block 23 may be easily and quickly removed for maintenance or replacement by removing the single screw 11 and sliding the wicking block 23 away from the reservoir outlet at counterbore 42.

As previously discussed, the oil or lubricant in reservoir 34 which is transmitted into the wicking chamber 49 by the feeder wick 25 is conveyed to the various parts of the crosshead and the crosshead guides by means of wicks 24 and 27. In order to effectively transmit the lubricant 16, both of the wicks 24 and 27 should contact the end of the feeder wick 25, and it is desirable to so position the wicks 24 and 27 within the wicking chamber 49 that space therein which may tend to undesirably effect pooling of lubricant is effectively filled so that such pooling does not occur. The positioning of the wicks 24 and 27 as described hereinafter is for a purpose of preventing such pooling from occuring as well as providing effective and efficient transmission precisely to the various parts of the crosshead and the crosshead guides. The wicking block floor 44 has three spaced apertures 53, 54, and 55 along its length. Aperture 54 is located centrally of the floor, aperture 55 is located adjacent the first end wall 47, and aperture 53 is located adjacent the second end wall 48. Wick 27 includes a first portion 56 which is an intermediate portion located within the wicking chamber 49 and extending between apertures 54 and 55 and which contacts or engages the end of feeder wick 25. One end portion 58 of wick 27 extends downwardly through a fitting or eyelet 28 in the central aperture 54 and slightly beyond the end of the fitting 28 so as to be centrally located above the crosshead 19. The opposite end portion 57 of wick 27 extends downwardly through aperture 55 and into the bore 60 of the respective crosshead guide 15. An end portion 59 of wick 24 extends downwardly through aperture 53 and into the bore 61 of the other crosshead guide 15.

Figure 4:
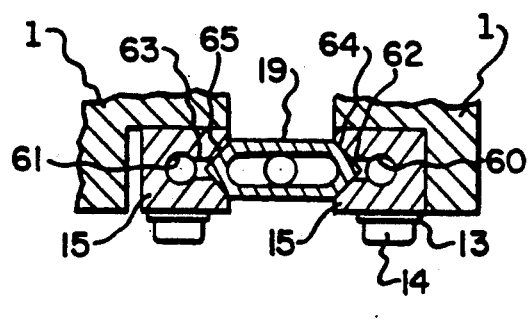
FIG. 4 is a view similar to that of FIG. 2 taken along lines 4—4 of FIG. 3 and showing the manner in which the crosshead is mounted in the crosshead guides.

Referring to FIG. 4, transverse conduits 62 and 63 are in communication with bores 60 and 61 respectively and terminate at V-shaped surfaces 64 and 65 respectively of the respective crosshead guides 15. It can thus be seen that lubricant 16 passes through the ends of the respective wick portions 57 and 59 into bores 60 and 61 and then to the surfaces of the crosshead guides 15 on which the crosshead 19 reciprocates.

Lubricant 16 is transmitted from the end of the felt portion 58 to a felt pad 30 which is attached to the crosshead 19 by means of rivets 29 or other suitable means. The lubricant is then transmitted through conduit 66 to oil felt wicking 31 in wrist pin 12 so as to provide lubrication between this pin and crosshead 19 as well as between this pin and the lower end of link 3. Horizontal holes (not shown) therefrom may also feed lubricant to the crosshead guide area.

In order to substantially fill the space in the wicking chamber 49, particularly the space adjacent the feeder wick 25, to prevent undesirable pooling of lubricant from occuring, the wick 24 extends from the aperture 53 over the length of the wicking chamber 49 to contact the end of the feeder wick 25 at which point it is folded and extends back over the length of the wicking chamber 49. Thus, an intermediate portion 67 and an end portion 68 of wick 24 as well as the intermediate portion 56 of wick 27 are provided to cram or substantially fill the space within the wicking chamber 49 particularly between the apertures 54 and 55 adjacent the entrance of the feeder wick 25 to prevent lubricant pooling so that more precise lubrication may be provided whereby heat build-up does not occur from too much lubrication and whereby oil leakage is prevented or reduced.

While the oil felt wicking may be of any suitable type, an example of satisfactory oil felt wicking is type F-1 density felt wicking provided by Buffalo Felt Company of Buffalo, N.Y. Wick 27 may have a length of perhaps about 3 inches and a diameter of perhaps about 0.093 inch. Wick 24 may have a length of perhaps 3.5 inches to allow it to be looped upon itself within the wicking chamber 49 and a diameter of perhaps about 0.093 inch.

Thus, a lubrication system with a lubricant reservoir has been provided within a housing portion of a cutting machine with a wicking block adjacent the lubricant outlet in accordance with the present invention so as to protect the lubrication system against damage while providing efficient transmission of lubricant for oiling the various machine parts so that over heating does not occur and to minimize oil leakage through the oil sight glass or leakage due to pooling of oil and wherein the wicking module is easily and quickly removable for maintenance or replacement.

It should be understood that while the invention has been described in detail herein, the invention can be embodied otherwise without departing from the principles thereof, and such other embodiments are meant to come within the scope of the present invention as defined by the appended claims.

What is claimed is:

1. A cutting machine comprising a housing member comprising a body having an outer surface and having an inner surface, motor means, a crosshead, a pair of spaced crosshead guide mens within said housing member for supporting said crosshead for reciprocatory movement, link means coupled to said motor means, wrist pin means coupled between said link means and said crosshead, knife means coupled to said crosshead for reciprocatory movement of said knife means, and means for lubricating said crosshead guide means and said wrist pin means, said lubricating means comprising a chamber formed in said body of said housing member between said inner and outer surfaces for defining a lubricant reservoir within said housing member and located above said wrist pin means and said crosshead for supplying lubricant thereto by gravity, bore means in said housing member inner surface and in flow communication with said lubricant reservoir, an elongate module positioned above said crosshead and removably attachable to said housing member and having a bottom wall, a top wall, a pair of side walls one of which engages said housing member for attachment therto, and a pair of end walls one of which has an aperture means extending therethrough and is adjacent said bore means when said module is attached to said housing member, lubricating wick means disposed partly in said module and extending out said bottom wall of said module for conducting lubricant to said crosshead guide means and said wrist pin means, and a feeder wick one end portion of which extends through said one module end wall aperture means and the other end portion of which extends into said bore means for conducting lubricant to said lubricating wick means in said module.

2. A machine according to claim 1 further comprising fastening means including a sealant for removably attaching said top wall to said module.

3. A machine according to claim 1 further comprising a grommet means through which said feeder wick extends, counterbore means in said bore means for engaging an end portion of said grommet means, and the other end portion of said grommet means extends through said one module end wall aperture means.

4. A machine according to claim 3 further comprising a screw means and aperture means in said side walls for receiving said screw means for removably attaching said module to said housing member.

5. A machine according to claim 3 wherein said grommet means is composed of polyurethane.

6. A machine according to claim 3 wherein said grommet means has a length which is less than about 0.33 inches.

7. A cutting machine comprising a housing member comprising a body having an outer surface and having an inner surface, motor means, a crosshead, a pair of spaced crosshead guide means within said housing member for supporting said crosshead for reciprocating movement, link means coupled to said motor means, wrist pin means coupled between said link means and said crosshead, knife means coupled to said crosshead for reciprocatory movement of said knife means, and means for lubricating said crosshead guide means and said wrist pin means, said lubricating means comprising a chamber formed in said body of said housing member between said inner and outer surfaces for defining a lubricant reservoir within said housing member and having an outer side wall and located above said wrist pin means and said crosshead for supplying lubricant thereto by gravity, a module positioned above said crosshead and attached to said housing member and having a bottom wall, lubricating wick means disposed partly in said module and extending out said bottom wall for conducting lubricant to said crosshead guide means and said wrist pin means, means for transmitting lubricant from said reservoir means to said lubricating wick means, and lubricant level sight means comprising aperture means in said outer side wall, a see-through member in said aperture means, and means including an O-ring means for sealingly attaching said see-through member in said aperture means.

8. A machine according to claim 7 further comprising an outer upper wall on said reservoir means and passage means in said outer upper wall for filling said reservoir means with lubricant.

9. A machine according to claim 7 wherein said module has an end wall positioned adjacent said housing member inner surface, aperture means in said module end wall, bore means in said housing member inner surface and in flow communication with said lubricant reservoir, and said lubricant transmitting means comprises a feeder wick one end portion of which extends into said housing member bore means and the other end portion of which extends through said module aperture means.

10. A machine according to claim 9 further comprising a grommet means through which said feeder wick extends, counterbore means in said bore means for engaging an end portion of said grommet means, and the other end portion of said grommet means extends through said one module end wall aperture means.

11. A machine according to claim 10 further comprising a single screw means and aperture means in said side walls for receiving said screw means for removably attaching said module to said housing member.

12. A machine according to claim 10 wherein said grommet means is composed of polyurethane.

13. A machine according to claim 10 wherein said grommet means has a length which is less than about 0.33 inch.

14. A cutting machine comprising a housing member comprising a body having an outer surface and having an inner surface, motor means, a crosshead, a pair of spaced crosshead guide means within said housing member for supporting said crosshead for reciprocatory movement, link means coupled to said motor means, wrist pin means coupled between said link means and said crosshead, knife means coupled to said crosshead for reciprocatory movement of said knife means, and means for lubricating said crosshead guide means and said wrist pin means, said lubricating means comprising a chamber formed in said body of said housing member between said inner and outer surfaces for defining a lubricant reservoir within said housing member and located above said wrist pin means and said crosshead for supplying lubricant thereto by gravity, bore means in said housing member inner surface and in flow communication with said lubricant reservoir means, an elongate module positioned above said crosshead and having a bottom wall, a removable top wall, a pair of sidewalls one of which engages said housing member for attachment thereto, and a pair of end walls one of which has an aperture means therein and is adjacent said housing member inner wall when said module is attached to said housing member, first and second aperture means which extend through said bottom wall and which are disposed adjacent said one end wall and the other of said end walls respectively, a third aperture means which extends through said bottom wall and which is disposed between said first and second aperture means, a first wick having a central portion lying within said module between said first and third aperture means and a pair of end portions which extend through said first and third aperture means respectively for conducting lubricant to one of said crosshead guide means and said wrist pin means respectively, a second wick having a first portion which extends through said second aperture means for conducting lubricant to the other of said crosshead guide means and a second portion which extends between said second aperture means and said one end wall within said module and is looped back upon itself to cram the space within said module between said first and second aperture means whereby pooling of lubricant within said module may be prevented, and a feeder wick one end portion of which extends through said module end wall aperture means and the other end of which extends into said bore means for conducting lubricant to said first and second wicks in said module.

15. A machine according to claim 14 wherein said reservoir means has an outer upper wall and an outer side wall, the machine further comprising passage means in said outer upper wall for filling said reservoir means with lubricant and further comprising lubricant level sight means including aperture means in said outer side wall, a see-through member in said outer side wall aperture means, and means including an o-ring means for sealingly attaching said see-through member in said outer side wall aperture means.

16. A machine according to claim 15 further comprising fastening means including a sealant for removably attaching said top wall to said module.

17. A machine according to claim 15 further comprising a grommet means through which said feeder wick extends, counterbore means in said bore means for engaging an end portion of said grommet means, and the other end portion of said grommet means extends through said one module end wall aperture means.

18. A machine according to claim 17 further comprising a single screw means and aperture means in said side walls for receiving said screw means for removably attaching said module to said housing member.

19. A machine according to claim 17 wherein said grommet means is composed of polyurethane.

20. A machine according to claim 17 wherein said grommet means has a length which is less than about 0.33 inches.

* * * * *